US007237936B1

(12) United States Patent
Gibson

(10) Patent No.: US 7,237,936 B1
(45) Date of Patent: Jul. 3, 2007

(54) VEHICLE LIGHT ASSEMBLY AND ITS ASSOCIATED METHOD OF MANUFACTURE

(76) Inventor: David J. Gibson, 482 E. Main St., Leola, PA (US) 17540

( * ) Notice: Subject to any disclaimer, the term of this patent is extended or adjusted under 35 U.S.C. 154(b) by 0 days.

(21) Appl. No.: 11/139,742

(22) Filed: May 27, 2005

(51) Int. Cl.
*B60Q 1/00* (2006.01)
*F21V 29/00* (2006.01)

(52) U.S. Cl. ........................ 362/547; 362/507; 362/294

(58) Field of Classification Search ................ 362/294, 362/373, 543–545, 507, 540–541, 547
See application file for complete search history.

(56) References Cited

U.S. PATENT DOCUMENTS 6,450,663 B1 * 9/2002 Reinbach .................... 362/249
2005/0018446 A1 * 1/2005 Ishida ........................ 362/545
2005/0180157 A1 * 8/2005 Watanabe et al. ........... 362/543

* cited by examiner

*Primary Examiner*—Ali Alavi
(74) *Attorney, Agent, or Firm*—LaMorte & Associates

(57) ABSTRACT

A lighting assembly and its method of manufacture. The lighting assembly has a heat sink. A plurality of surfaces are disposed on the front of the heat sink. At least one first surface is oriented in a first plane and at least one second surface is oriented in a second plane. A first plurality of light sources are mounted to at least one first surface. A second plurality of light sources are mounted to at least one second surface. As a consequence, light can be directed in two distinct directions to create a discernable high beam condition and low beam condition. A space is defined in front of the light sources. At least one heat exchange element is provided that protrudes forward from a heat sink into the space thereby helping to vaporize any condensation that may form within that space.

16 Claims, 2 Drawing Sheets

VEHICLE LIGHT ASSEMBLY AND ITS ASSOCIATED METHOD OF MANUFACTURE

BACKGROUND OF THE INVENTION

1. Field of the Invention

The present invention relates to vehicle lights, such as headlights and tail lights, that are used on the exterior of a vehicle. More particularly, the present invention relates to vehicle light assemblies that are comprised of an array of small lights and the structure of such assemblies.

2. Prior Art Description

Most modern motor vehicles have headlights that enable the vehicle to be driven at night. However, the design of headlights has evolved greatly over time. Initially, lights used on horse-drawn carriages and the earliest automobiles were open flame lamps. Open flame lamps were quickly replaced with electric headlights. The first electric headlights contained a single incandescent light bulb that was powered by the battery of the vehicle. Accordingly, the headlights could be turned either “on” or “off”. Eventually, incandescent bulbs were created for vehicles that contained two elements. One element was lit during normal driving condition and both elements were lit when a driver needed more light. Thus, a vehicle headlight could light in a low beam condition or a high beam condition.

A problem associated with headlights that use incandescent bulbs is the use of electrical power. Incandescent bulbs require a large flow of current. However, in modern automobile, electric current is becoming a scarce commodity. In modern automobiles, more and more electronic features are being added in each model year. The demand for more electricity has caused many vehicle manufacturers to increase the size and power of both the battery and the power alternator that are built into the vehicle. However, due to the small amount of space available in the engine compartment of a modern vehicle, the size of the vehicle battery and alternator also needs to be limited.

Recognizing the need to save energy, headlights for vehicles have been designed that used low power light emitting diodes (LEDs) rather than incandescent bulbs. Although a single LED cannot match the power of an incandescent headlight bulb, an array of LEDs can. Thus, vehicle headlights comprised of an array of LEDs have been designed. Such prior art LED headlights are exemplified by U.S. Patent Application Publication No. 2003/0147252 to Floravanti, entitled Front Lighting System For A Motor Vehicle.

Although LEDs use less power than conventional incandescent headlights, prior art LED headlights do have some disadvantages. One disadvantage is that LEDs must be mounted to a substrate that provides power to the LEDs. The substrate must be coupled to a heat sink or otherwise cooled in order to have the LED headlight last for the projected life of the vehicle. Furthermore, since the LEDs are affixed to a common substrate, all the LEDs in the array tend to be pointing in the same direction. As a consequence, the direction of the beam of light remains constant. The only way to produce a high beam condition and a low beam condition is to vary the intensity of the headlight by controlling the number of LEDs in the array that are lit. It is therefore difficult to create a discernable low beam condition and high beam condition.

Another disadvantage of LED headlights is the ability to vaporize condensed water. Water vapor often condenses within the structure of a headlight. A traditional incandescent headlight can quickly vaporize such condensation once the headlight is lit. Thus, the condensation has little effect on the performance of the headlight. However, an LED headlight uses an array of LEDs, a larger surface is available onto which condensation can form. Once the condensation forms on the various LEDs, the LEDs lack the power output needed to quickly vaporize the condensation. The result is that the condensation remains on the LEDs, distorting and diminishing the light emitted by the LEDs.

A need therefore exists for an improved structure of an LED headlight that has a well defined high beam and low beam. A need also exists for an LED headlight that eliminates the adverse effects of condensation forming on the LEDs. These needs are met by the present invention as described and claimed below.

SUMMARY OF THE INVENTION

The present invention is a lighting assembly and its method of manufacture. The lighting assembly has a heat sink. A plurality of surfaces are disposed on the front of the heat sink. Of the surfaces that are provided, there is at least one first surface that is oriented in a first plane and at least one second surface that is oriented in a second plane.

A first plurality of light sources are mounted to at least one first surface. The first plurality of light sources emit light at a perpendicular to that first surface. A second plurality of light sources are mounted to at least one second surface. The second plurality of light sources emit light at a perpendicular to that second surface. As a consequence, light can be directed in two distinct directions to create a discernable high beam condition and low beam condition.

A protective cover is disposed over the various light sources. A space is defined between the protective cover and the light sources. At least one heat exchange element is provided that protrudes forward from a heat sink into the space between the light sources and the protective cover. The heat exchange element exchanges heat within the space, thereby helping to vaporize any condensation that may form within that space.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Although the present invention light assembly can be used as a spot light or flood light, the present invention is especially well suited for use as a vehicle headlight. Accordingly, the exemplary embodiment of the present invention that is illustrated and described, shows the light assembly configured as a vehicle headlight. This exemplary embodiment is selected to present the best mode contemplated for the invention and the selected embodiment should not be considered a limitation on the forms that the light assembly can take.

Figure 1:
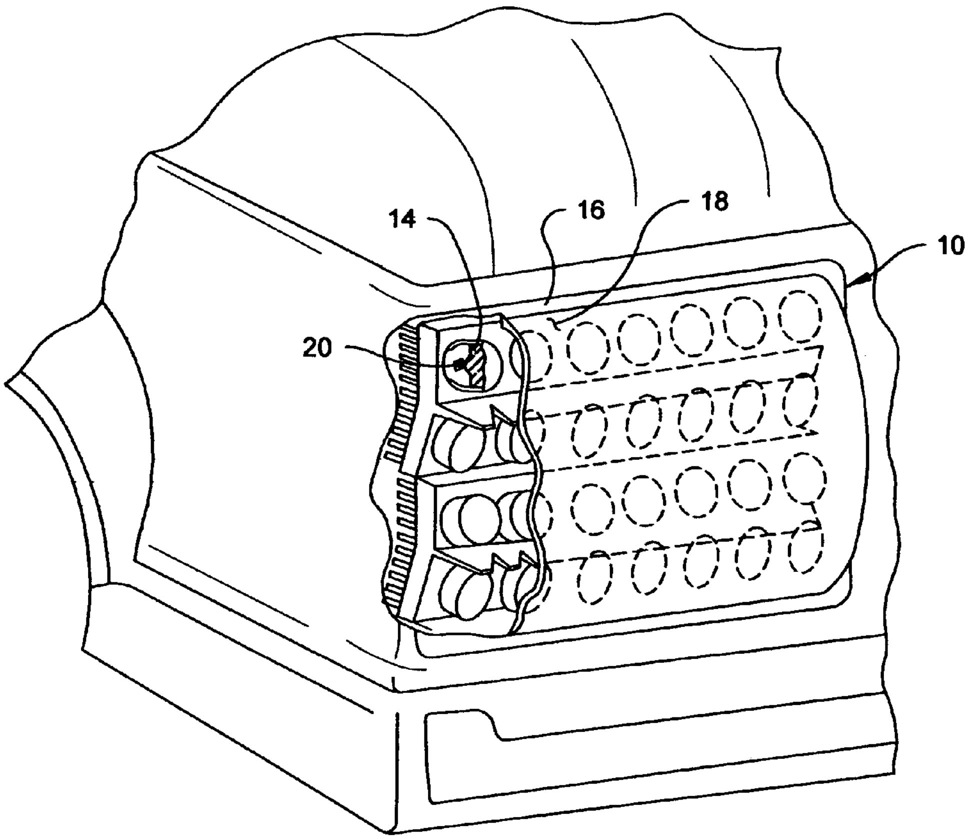
FIG. 1 is a selectively fragmented perspective view of an exemplary headlight assembly on the fender of an automobile.

Referring to FIG. 1, a headlight assembly 10 is shown affixed to the front of a motor vehicle. The headlight assembly 10 contains an internal array of light emitting diodes (LEDs) 20 that produce light. The LEDs 20 are disposed behind focusing lens elements 14 that collimate the light produced by the LEDs 20. Both the LEDs 20 and the lens elements 14 are set in a headlight housing 16 that has a transparent protective cover 18. The transparent protective cover 18 protects the LEDs 20 and lens elements 14 from dirt, water and other grime.

In the headlight assembly 10, not all the LEDs 20 are oriented in the same direction. Rather, a first plurality of the LEDs 20 is oriented in a first direction. A second plurality of the LEDs 20 are oriented in a second direction. Having the LEDs 20 mounted in two orientations allows the headlight assembly 10 to produce a discernable high beam and low beam, as is later described in more detail.

Figure 2:
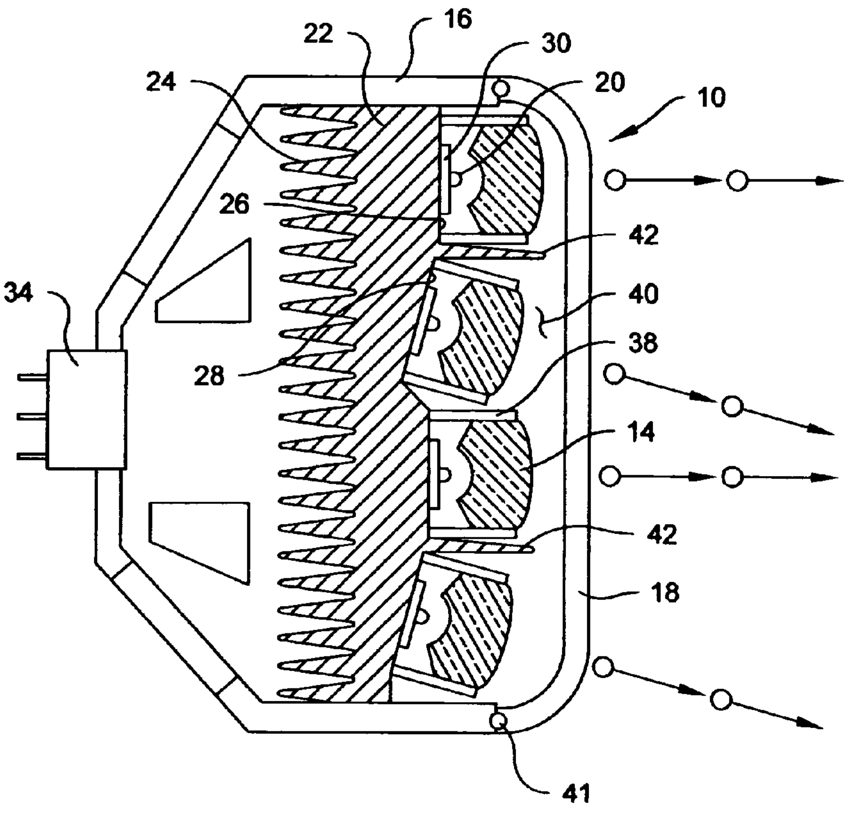
FIG. 2 is a cross-sectional view of the embodiment of the headlight assembly shown in FIG. 1.

Referring to FIG. 2, it can be seen that within the housing 16 of the light assembly 10 is contained a heat sink 22. The heat sink 22 has a ribbed rear surface 24 that extends into a rear section 25 of the housing 16. The rear section is vented so that the ribbed rear surface 24 remains exposed to the fender cavity of the motor vehicle where it is free to exchange heat into the ambient air as the vehicle is driven.

The front surface of the heat sink 22 is not flat. Rather, the front surface of the heat sink 22 has a stepped configuration that provides the heat sink 22 with two sets of mounting surfaces 26, 28. A first set of mounting surfaces 26 are generally vertical. The second set of mounting surfaces 28 are angled at an acute angle relative the vertical.

LEDs 20 are mounted to the front surface of the heat sink 22 on both the first set and second set of mounting surfaces 26, 28. The LEDs 20 emit light at a perpendicular to the surface on which they are mounted. Consequently, the LEDs 20 that are mounted to the vertical first set of mounting surfaces 26 emit light in, or near, the horizontal. The LEDs 20 that are mounted to the angled second set of mounting surfaces 28 emit light at an angle below the horizontal.

It will therefore be understood that when the headlight assembly 10 is mounted in a vehicle, light can be projected in two directions. When the LEDs 20 on the first set of mounting surfaces 26 are lit, light travels straight out of the headlight assembly 10. This creates the high beam operational lighting for the vehicle. When the LEDs 20 on the second set of mounting surfaces 28 are lit, light is projected slightly downward in front of the vehicle. This creates the standard low beam operational lighting for the vehicle.

Within the headlight assembly 10, a circuit board 30 is interposed between each of the LEDs 20 and the mounting surfaces 26, 28 of the heat sink 22. The circuit boards 30 can be separate pieces or can be formed in as substrates that are directly bonded to the mounting surfaces 26, 28 of the heat sink 22. The circuit boards 30 couple the LEDs 20 to wires (not shown) that supply power to the LEDs 20. The wires extend from the LEDs 20 and terminate at the rear of the headlight housing 16 with a wire cable connector or plug 34. Utilizing the plug 34, the headlight assembly 10 can be connected to the electrical wiring and controls of the vehicle.

Casings 38 surround the LEDs 20. Each casing 38 is cylindrical in shape and supports a lens element 14 in front of each LED 20. The optical characteristics of the lens element 14 can be engineered to specific needs. However, in a headlight, it is desirable that the light emitted by the LEDs 20 be directed in front of the vehicle in relatively tight beams. Accordingly, the lens elements 14 preferably collimate the light of the LEDs 20 so that light remains in confined beams.

The transparent protective cover 18 is positioned over the front end of the housing 16. Thus, all the LEDs 20 and lens elements 14 are disposed between the front of the heat sink 22 and the transparent protective cover 18. An elastomeric seal 41 is present in between the housing 16 and the transparent protective cover 18. The elastomeric seal 41 is used to hermetically seal the space 40 surrounding the LEDs 20. However, no seal can be assumed to remain perfect under all conditions. Over time some water vapor may indeed enter the confined space 40 behind the transparent protective cover 18. Under some atmospheric conditions, this water vapor can condense and fog the lens elements 14 and the inside of the transparent protective cover 18. The condensing water vapor may also act to corrode the LEDs 20, thereby shortening the life of the overall headlight assembly 10.

At least one heat exchange element 42, such as a thin fin, is disposed on the front surface of the heat sink 22. The heat exchange elements 42 extend forward beyond the LEDs 20 into the open space 40 behind the transparent protective cover 18. The heat exchange elements 42 are part of the heat sink 22. Thus, the temperature of the heat exchange elements 42 increases as the heat sink 22 absorbs heat from the LEDs 20. The result is that the heat exchange elements 42 heat the space 40 within the headlight assembly 10 behind the transparent protective cover 18. This helps vaporize the condensation and prevent the condensation from adversely effecting either the headlight assembly 10 or the brightness of the light emitted by the headlight assembly 10.

The heat exchange elements 42 are strategically placed within the structure of the headlight assembly 10 to act as light baffles. The heat exchange elements 42 help to prevent light from exiting the light assembly at any angle above the horizontal. In this manner, the heat exchange elements 42 ensure that light is emitted from the headlight assembly 10 only in the directions desired.

It will be understood that the exemplary embodiment that is shown and illustrated is merely exemplary. As such, it is expected that a person skilled in the art can make many variations and alternate embodiments of the present invention by using functionally equivalent components. For example, the number of LEDs used in the assembly can be altered. Furthermore, the shape of the headlight assembly, including the shape of the heat sink and transparent protective cover, is believed to be a matter of design choice. All such variations, modifications and alternate embodiments are intended to be included within the scope of the present invention as set forth by the claims.

What is claimed is:

1. A lighting assembly, comprising:

a heat sink having a front and a rear, wherein a plurality of surfaces are disposed on said front of said heat sink, wherein said plurality of surfaces include at least one first surface that is oriented in a first plane and at least one second surface that is oriented in a second plane;

a first plurality of light sources mounted to said at least one first surface, wherein said first plurality of light sources emit light at a perpendicular to said at least one first surface;

a second plurality of light sources mounted to said at least one second surface, wherein said second plurality of light sources emit light at a perpendicular to said at least one second surface;

a transparent protective cover, wherein a space exists between said front of said heat sink and said transparent protective cover; and at least one heat exchange element that protrudes forward from said heat sink into said space between said heat sink and said transparent protective cover.

2. The assembly according to claim 1, wherein heat exchange ribs extend from said rear surface of said heat sink.

3. The assembly according to claim 1, further including lens elements positioned over said first plurality of light sources and said second plurality of light sources.

4. The assembly according to claim 1 wherein said first plurality of light sources and said second plurality of light sources are light emitting diodes.

5. A headlight assembly for a vehicle, comprising:

a heat sink having a front and a rear;

light sources positioned on said front of said heat sink, wherein said heat sink absorbs heat generated by said light sources;

a protective cover disposed over said light sources, wherein a space is defined between said protective cover and said light sources; and at least one heat exchange element protruding forward from said heat sink into said space between said light sources and said protective cover, wherein said at least one heat exchange element exchanges heat with said space.

6. The assembly according to claim 5, wherein said light sources are light emitting diodes.

7. The assembly according to claim 5, wherein heat exchanging ribs are disposed on said rear of said heat sink.

8. The assembly according to claim 5, wherein a plurality of surfaces are disposed on said front of said heat sink, wherein said plurality of surfaces includes at least one first surface that is oriented in a first plane and at least one second surface that is oriented in a second plane.

9. The assembly according to claim 8, wherein said light sources include:

a first plurality of light sources mounted to said at least one first surface, wherein said first plurality of light sources emit light at a perpendicular to said at least one first surface; and a second plurality of light sources mounted to said at least one second surface, wherein said second plurality of light sources emit light at a perpendicular to said at least one second surface.

10. The assembly according to claim 5, further including lens elements positioned over said light sources for focusing light emitted by said light sources into confined beams.

11. A method of producing a headlight assembly having a high beam condition and a low beam condition, said method comprising the steps of:

providing a heat sink having a front and a rear, wherein a plurality of surfaces are disposed on said front of said heat sink, said plurality of surfaces including at least one first surface that is oriented in a first plane and at least one second surface that is oriented in a second plane;

mounting a first plurality of light sources to said at least one first surface, wherein said first plurality of light sources emit light at a perpendicular to said at least one first surface, creating said low beam condition; and mounting a second plurality of light sources to said at least one second surface, wherein said second plurality of light sources emit light at a perpendicular to said at least one second surface creating said high beam condition.

12. The method according to claim 11, further including the step of providing heat exchange ribs on said rear of said heat sink.

13. The method according to claim 11, further including the step of providing a transparent protective cover, wherein a space exists between said front of said heat sink and said transparent protective cover.

14. The method according to claim 13, further including the step of providing at least one heat exchange element that protrudes forward from said heat sink into said space between said heat sink and said transparent protective cover.

15. The method according to claim 11, further including the step of providing lens elements positioned over said first plurality of light sources and said second plurality of light sources.

16. The assembly according to claim 11, wherein said first plurality of light sources and said second plurality of light sources are light emitting diodes.

* * * * *